US012205261B2

(12) United States Patent
Aehling et al.

(10) Patent No.: US 12,205,261 B2
(45) Date of Patent: Jan. 21, 2025

(54) SENSOR ARRANGEMENT FOR DETECTING CONSTITUENTS

(71) Applicant: DEERE & COMPANY, Moline, IL (US)

(72) Inventors: Ludger Aehling, Herxheim am Berg (DE); Peter Schade, Bad Dâœrkheim (DE)

(73) Assignee: Deere & Company, Moline, IL (US)

( * ) Notice: Subject to any disclaimer, the term of this patent is extended or adjusted under 35 U.S.C. 154(b) by 366 days.

(21) Appl. No.: 17/662,167

(22) Filed: May 5, 2022

(65) Prior Publication Data
US 2022/0358633 A1 Nov. 10, 2022

(30) Foreign Application Priority Data
May 6, 2021 (DE) .......................... 102021111827.1

(51) Int. Cl.
*G06T 7/00* (2017.01)
*G05D 1/00* (2006.01)
*G06T 7/80* (2017.01)

(52) U.S. Cl.
CPC ......... *G06T 7/0002* (2013.01); *G05D 1/0094* (2013.01); *G06T 7/80* (2017.01); *G06T 2207/10088* (2013.01)

(58) Field of Classification Search
CPC ..................... G06T 7/0002; G06T 7/80; G06T 2207/10088; G05D 1/0094; G01N 21/85;
(Continued)

(56) References Cited

U.S. PATENT DOCUMENTS 9,562,848 B2 2/2017 Goldring et al.
2015/0227863 A1 8/2015 Sukuta

FOREIGN PATENT DOCUMENTS

DE   10236515 C1   9/2003
DE   19922867 C5   4/2015
(Continued)

OTHER PUBLICATIONS

Baianu, High-Resolution Nuclear Magnetic Resonance and Near-Infrared Determination of Soybean Oil, Protein, and Amino Acid Residues in Soybean Seeds, 1st Edition, First Published 2004, Imprint: AOCS Publishing, eBook ISBN9780429104527) (Year: 2004).*

(Continued)

*Primary Examiner* — Vu Le
*Assistant Examiner* — Lei Zhao

(57) ABSTRACT

Systems and apparatus are disclosed to detect constituents using a sensor arrangement. A sensor apparatus for detecting constituents of a material includes a first sensor, which interacts with the material, and is configured to measure an optical spectrum of the material. Further, the first sensor is coupled to an evaluation device that is configured to output an output value relating to the level of the one or more constituents in the material with the aid of the measured spectrum and calibration data. The sensor apparatus further includes a second sensor configured to analyse the material examined by the first sensor and to output a signal relating to the level of the one or more constituents in the material. The sensor apparatus further includes a calibration data generating device configured to generate the calibration data for the evaluation device with the aid of the signal of the second sensor.

12 Claims, 2 Drawing Sheets

(58) Field of Classification Search
CPC ... G01N 2021/8466; G01N 2021/8592; G01N 21/84
See application file for complete search history.

(56) References Cited

FOREIGN PATENT DOCUMENTS

| | | | | |
|---|---|---|---|---|
| DE | 102017204105 A1 | * | 9/2018 | ............. G01N 33/24 |
| DE | 102020000904 A1 | | 8/2021 | |
| EP | 0908087 A1 | | 4/1999 | |
| EP | 1378742 A2 | | 1/2004 | |
| EP | 1407654 A1 | * | 4/2004 | ........... A01D 41/127 |
| EP | 3282246 A1 | | 2/2018 | |
| EP | 3444577 A1 | * | 2/2019 | ......... A01D 41/1277 |
| FR | 2801380 A1 | | 5/2001 | |
| WO | WO-0161617 A1 | * | 8/2001 | ........... A01D 41/127 |
| WO | WO2001061617 A1 | | 8/2001 | |
| WO | WO2005003728 A2 | | 1/2005 | |
| WO | WO2019028540 A1 | | 2/2019 | |

OTHER PUBLICATIONS

Martin Ewers et al., Sensor for determination of product quality of grain while combining, pp. 1-6.
Agricultural Engineering for a Better World, dated Sep. 7, 2006, pp. 162-165.
J. B. Reeves III et al., Near-Infrared Spectroscopic Determination of Carbon, Total Nitrogen, and Ammonium-N in Dairy Manures, dated Mar. 2, 2000, pp. 1829-1836, Journal of Dairy Science vol. 83, No. 8.
Pierluigi Mazzei et al., HRMAS NMR spectroscopy applications in agriculture, dated Feb. 13, 2017, pp. 1-13, DOI 10.1186/s40538-017-0093-9.

\* cited by examiner

SENSOR ARRANGEMENT FOR DETECTING CONSTITUENTS

RELATED APPLICATIONS

This document claims priority based on German Patent Application No. 102021111827.1, filed on May 6, 2021, which is hereby incorporated by reference into this application.

DESCRIPTION

The disclosure relates to a sensor arrangement for detecting constituents of an examined material.

BACKGROUND

The measurement of constituents by means of optical spectroscopy, in particular near-infrared (NIR) spectroscopy is nowadays an established technology. It is used in many applications, for example in the food industry and in agriculture, for example to examine the state of plants growing on a field, constituents of harvested plant parts or in soils, or the composition of slurry or milk.

In this case, spectroscopic measurements of a substance are conducted, for example in reflection and/or transmission. The wavelength-dependent intensities, generally and in what follows referred to as a spectrum, are obtained. The constituents are calculated from the spectrum with the aid of a calibration function. A spectroscopic measurement is therefore conducted on a number of samples, each with known constituent levels, to determine the associated relationship (here: coefficient and offset) for a constituent to be examined for each of the i wavelengths examined. The problem therefore arises of compiling the relationships for varied materials and constituents, i.e., generating a sufficiently large and accurate learning data set, and providing them to the spectrometers for the measurement. The use of different relationships for each type of material and constituent is usually provided for materials to be examined in the food sector and agriculture since they consist of more or fewer heterogeneous substance mixtures. Thus, in the analysis of the constituents of green plants, different relationships are required for grass and corn.

SUMMARY

A sensor apparatus for detecting constituents of a material, the apparatus comprising: a first sensor, which interacts with the material, configured to measure an optical spectrum of the material and is coupled to an evaluation device that is configured to output an output value relating to the level of the one or more constituents in the material with the aid of the measured spectrum and calibration data; a second sensor configured to analyse the material examined by the first sensor and to output a signal relating to the level of the one or more constituents in the material; and a calibration data generating device configured to generate the calibration data for the evaluation device with the aid of the signal of the second sensor.

An agricultural working machine comprising: a first sensor, which interacts with a material being processed by the agricultural working machine, configured to measure an optical spectrum of the material and is coupled to an evaluation device that is configured to output an output value relating to the level of the one or more constituents in the material with the aid of the measured spectrum and calibration data; a second sensor configured to analyse the material examined by the first sensor and to output a signal relating to the level of one or more constituents in the material; and a calibration data generating device configured to generate the calibration data for the evaluation device with the aid of the signal of the second sensor.

No. EP 3 282 246 A1 describes a sensor arrangement for detecting the constituents of slurry, which comprises an NIR sensor and an NMR sensor, the output values of which can be fused. Simultaneous measurement accordingly takes place with the two sensors.

One disadvantage of certain examples of compiling the relationships for spectroscopic sensors by means of a constituent analysis in the laboratory is that a large number of laboratory analyses are required, and these need to be manually compiled expensively. Furthermore, the sample during the analysis in the laboratory no longer necessarily corresponds to the sample taken during the working or harvesting process since it has aged in the meantime (weathering or decay processes may for example have occurred), which impairs the accuracy of the compilation of the relationships, particularly if the underlying spectra were taken during the harvesting process whereas atypical (i.e. aged) samples, which do not necessarily match the materials to be found in the field, are used for recording the spectra in the laboratory. Another problem, for example with slurry, is that the material presentation for the spectroscopic sensor in the laboratory—during recording of the spectra carried out there—cannot be readjusted well, since whereas the later measurement in the machine takes place at a tube with a large diameter, this can scarcely be represented in the laboratory, for example in relation to flow rate and other parameters.

The calibration described in European Patent Appl. No. EP 0 908 087 A1 of a first sensor with the aid of the measurement values of a second sensor is restricted to the simple case of a pure moisture sensor in which a simple correction factor is sufficient for the calibration. This procedure cannot readily be applied to the data evaluation of spectroscopic sensors.

In European Patent Appl. No. EP 3 282 246 A1, an NMR sensor is used as a second sensor, its output signal being merged with that of the NIR sensor. This fusion of the signals cannot solve the described problem of compiling the relationships between the spectra and constituent levels for spectroscopic sensors.

In one embodiment of this disclosure, a sensor arrangement for detecting constituents of a material to be examined comprises a first sensor, which interacts with the material, is configured to measure an optical spectrum of the material and is coupled to an evaluation device that is configured to output an output value relating to the level of the one or more constituents in the material with the aid of the measured spectrum and calibration data. A second sensor is configured to analyse the material examined by the first sensor and to output a signal relating to the level of the one or more constituents in the material. A calibration data generating device is configured to generate the calibration data for the evaluation device, which are subsequently used for the chronologically following measurements of the first sensor, with the aid of the signal of the second sensor.

In other words, the material is examined twice, namely on the one hand by a first, optical sensor, which provides a spectrum, and on the other hand by a second sensor which determines the constituent level of the material, the latter in turn being used to provide calibration data for an evaluation device which determines the constituent level of the material with the aid of the spectrum. In this way, the recording of the spectrum and further sensing of constituents, as well as a compilation of calibration data which is based thereon, take place in situ, which avoids the disadvantages, in particular relating to the ageing of the samples in the case of laboratory analyses.

The first sensor may be a near-infrared (NIR) spectrometer operating in reflection and/or transmission. The second sensor may be a nuclear magnetic resonance (NMR) sensor. The evaluation device may generate the output value with the aid of relationships, which are saved in a memory, between the spectra and the output value.

In a first embodiment, the evaluation device may use the calibration data during subsequent measurements to correct an output value generated with the aid of a spectrum and the stored relationships. In this embodiment, the relationships therefore remain unchanged, but instead the (raw) constituent level determined with the aid of the spectrum and the relationships is readjusted, or modified, with the aid of the calibration data, for example provided as a mathematical relation.

In a second embodiment, the evaluation device uses the calibration data during subsequent measurements as a relationship between the spectra and the output value. To this end, the calibration data generating device is configured to ascertain a relationship (used as calibration data) between the spectrum and the level of the at least one constituent in the material with the aid of the spectrum and the signal of the second sensor, and the evaluation device is configured to use the calibration data during subsequent measurements as a relationship between the spectra and the output value. In this embodiment, the relationship is therefore compiled in situ and used during subsequent measurements.

The first sensor may be adjacent to a channel through which the material flows, whereas the second sensor may analyse a sample of the material taken from the channel. The calibration data generating device may have a signal-transmitting connection to a third sensor, which has the same design as the first sensor, to send calibration data. The sensor arrangement may be used on an agricultural working machine, the level of the one or more constituents in the sample, which may for example be plants growing on a field or harvested plants or slurry, measured by the sensor arrangement, being stored with geo-referencing for documentation purposes and/or used to drive an actuator.

FIG. 1 schematically shows a stationary or mobile agricultural machine 10. A channel 12, through which a material 14 to be examined flows during operation, is formed inside the machine 10. The material 14 may be conveyed actively in the channel 12, for example by a screw conveyor (not shown), or it is actively conveyed upstream and/or downstream of the channel 12, or it flows through the channel 12 merely by the effect of gravity and/or a pressure difference. The material 14 may be solid or liquid material, for example crop, such as grain harvested and separated from crop residues such as straw, chaff and litter in a combine harvester, or chopped crop in a forage harvester. It may also be liquid material, such as milk or slurry or fruit juice, wine, or beer. It would also be conceivable for the sensors 16 and 18 described in more detail below not to be positioned at a channel 12 through which flow takes place, but to be moved past the material, for example a swathe lying on a field (cf. European Patent Appl. No. EP 1 407 654 A1), or the material is soil over which or through which the sensor arrangement is guided in order to detect its constituents, and in particular a fertiliser requirement. The machine 10 may accordingly be for example a combine harvester, a forage harvester, a baler, a slurry tank, a sowing or fertilising machine, or a milking robot. The machine 10 could also be any desired stationary machine which processes or at least conveys any desired substance (in particular a foodstuff) in any way.

The level of the one or more constituents in the material 14, measured by the sensor arrangement, may be stored with geo-referencing for documentation purposes and/or used to drive an actuator. If the machine 10 comprises a slurry tank and the sensor arrangement interacts with the contents of the slurry tank or the slurry flowing into or out of the latter, its output value may be used to control the delivery of the slurry onto a field on the basis of the level of the one or more constituents in the sensed material, detected by the sensor arrangement.

A first sensor 16 and a second sensor 18 are assigned to the channel 12. The first sensor 16 comprises a spectrometer 26 for recording the level of one or more constituents in the material 14. A window 22, through which a light source 24 applies light to the material 14 flowing outside the housing 20 in the channel 12 through an opening in the channel 12, is arranged inside a housing 20. The light may be broadband or comprise only discrete wavelengths, which are emitted chronologically in succession or simultaneously, the wavelength conventionally comprising the near infrared range.

Light reflected by the material 14 being examined (or for example in the case in which the light source 24 is to be arranged outside the housing 20, transmitted through the material 14—or influenced in another way by the material, for example transflected, i.e. reflected on a mirror, or transduced, i.e. absorbed by the material on a contact surface) is analysed by the spectrometer 26, sensitive in the wavelength range of the light source 24 and arranged inside the housing 20, which gives out a spectral signal that contains information relating to the associated intensity for particular wavelengths of the received light, on a line 28. The spectrometer 26 may in a manner known per se comprise a dispersive element 30 (for example prism, filter, grating, etc.) which deflects the incoming light in directions dependent on the wavelength, this light being received by a plurality of photosensitive elements of a detector array 32 (photodiodes, charge-coupled devices (CCDs) or the like) which are respectively assigned to a wavelength range (see German Patent Appl. No. 199 22 867 C5). In another embodiment, there is only a single photosensitive element, to which the light split into different wavelengths by the dispersive element is delivered chronologically in succession (cf. European Patent Appl. No. EP 3 444 577 A1). The spectral signal present on the line 28 therefore contains information relating to the intensities of different wavelengths of the light, which was provided by the light source 24, reflected and/or transmitted by the material 14.

The second sensor 18 does not interact with the material 14 flowing in the channel 12 but receives a sample of the material 14, taken from the channel 12, for measurement. This makes it possible for the second sensor 18 to be able to interact with the material 14 over an arbitrarily long measurement time, which increases the measurement accuracy of the second sensor 18 in relation to a measurement of the flowing material, as is carried out by the first sensor 16. In other embodiments, however, the second sensor 18 may also interact with the flowing material and/or the first sensor 16 may also interact with a sample of the material 14 which is taken from the channel 12.

The second sensor 18 is assigned a sampling apparatus, which in the embodiment represented comprises a flap 34 that is arranged in an opening in the wall of the channel 12 and is tilted by an adjustment drive 36 between a first position, in which the flap 34 is in the opening, and a second position in which the flap 34 is tilted into the channel 12 by the adjustment drive 36 about an axis located at its end lying downstream and extending transversely to the longitudinal direction of the channel 12 (in FIG. 1, the flap is denoted there by 34' and is shown in dashes) in order to guide a sample of the material 14 out of the channel 12 into the interior of the housing 38. The sample of the material 14 is therefore conveyed into the housing 38 by the dynamic pressure of the flowing material 14 when there is an empty housing 38 and a flap 34 located in the second position.

Inside the housing 38, there is a plunger 40 which makes it possible to expel a sample of the material 14, located in the housing 38, from the housing 38 by pressing it out of the housing 38 when the flap 34 is in the second, open position. To this end, the plunger 40 is connected to a drive 42 which can move the plunger 40 between a resting position, as is shown in FIG. 1 and in which the plunger 40 is separated as far as possible from the flap 34, and a position adjacent to the flap 34. Expediently, while the plunger 40 remains in the position adjacent to the flap 34, the flap 34 is then closed, i.e., brought into the first position, so that the material 14 conveyed out of the housing 38 is carried away by the material 14 flowing past, and the flap 34 is only then opened. For this reason, the flap 34' also does not touch the wall, shown underneath, of the channel 12 in the second position so that the material 14 can flow past the open flap 34'. The plunger 40 preferably bears on the walls of the housing 38 in order to clean the sample of the material 14 from the latter. The drive 42 of the plunger 40 and the adjustment drive 36 of the flap 34 are connected to a controller 50, which drives them in the described manner in order to fill the housing 38 with a sample of the material 14 when required and empty it again after the conclusion of a measurement. It would also be conceivable to fill a separate container with the said sample after the measurement, to be able to subject it to a control examination in the laboratory. The arrangement shown in FIG. 1 for taking the sample of the material 14 from the channel 12 is only one possible exemplary embodiment, which could be replaced with one of the sampling devices disclosed in European Patent Appl. No. EP 0 908 087 A1, WIPO Patent Appl. No. WO 2005/003728 A2, German Patent Appl. No. DE 102 36 515 C1 or by M. Ewers et al. (ibid).

In the embodiment represented, the second sensor 18 is an NMR sensor which comprises a number of coils 44 for generating a static magnetic field and a varying magnetic field and a detection device for measuring a resulting electromagnetic field, which are coupled to a monitoring and evaluation device 46 of the second sensor 18. The second sensor 18 has an outgoing line 48 on which a signal, which contains information relating to the level of one or more constituents in the sample examined by the second sensor 18, at least one of which is also measured by the first sensor 16, is provided. For details of embodiments of the second sensor 18 and its signal evaluation (reference is made to Mazzei et al., ibid, and the references cited therein).

The first sensor 16 has an outgoing line 28 on which a signal, which represents a spectrum recorded from the material 14 flowing past, i.e., the intensity of the radiation from the light source 24 reflected or transmitted by the material 14, as already mentioned above, is provided. The line 28 is coupled to an evaluation unit 52 which, with the aid of relationships saved in a memory 54 between the spectra and one or more constituents, generates an output value 56 that represents the level of the said constituent(s) in the material 14 being examined. These constituents, in the case of crop, may be organic constituents such as starch, enzyme-soluble organic substances (Enlist), oil and raw protein. The level of inorganic constituents such as mineral substances (ash), for example sodium and magnesium, water, or quantities derived therefrom, such as dry matter, fibre length, digestibility, energy content and raw fibre content of the crop, may also be detected.

In agricultural products, sugar, fat, protein, alcohol, water, or any other desired constituents may be detected as constituents, and in slurry, for example, the constituents: nitrogen, ammonium, phosphorus, potassium. The relationships saved in the memory 54 therefore make it possible, with the aid of the spectrum, to calculate how high the level of the constituent is in the material 14 being examined. Details of a procedure for compiling these relationships and for calculating the constituents with the aid of the relationships are described in German Patent Appl. No. DE 10 2020 000 904 A1, the disclosure of which is incorporated by reference into the present documents.

The second sensor 18 provides the level of one or more constituents in the sensed material, determined by the second sensor 18, via the line 48 to a calibration data generating device 58. Precisely this level of constituent(s) has also been determined by the evaluation device 52 with the aid of the spectrum determined by the first sensor 16 for the same material 14. The calibration data generating device 58 is therefore capable of comparing the levels determined by the two sensors 16 and 18 (or other quantities related thereto, as mentioned below) and of supplying suitable calibration data on the basis thereof to the evaluation device 52, so that the latter can convert future spectra into the said levels with a higher accuracy than would be possible without the second sensor 18.

A first procedure for this is represented in FIG. 2. After the start in step 100, a measurement of material 14 is carried out with the first sensor 16 in step 102, and in step 104 the same (or at least nearly the same) material 14 as was examined by the first sensor 16 is delivered to the sensor 18 and analysed by it. To ensure that the same material 14 is actually analysed by both sensors 16, 18, the controller 50 is correspondingly programmed and connected to the evaluation device 52 and the monitoring and evaluation device 46. For example, an output value 56 for a constituent level, satisfying a particular criterion (for example typical level of a constituent or a large or small level, or a level no longer detectable by the second sensor 18 over a prolonged time) may induce the controller 50 to initiate sampling of the second sensor 18. The measurement in the second sensor 18 may extend over a longer period of time.

In step 106, a calibration value for the first sensor 16 is calculated, as represented in more detail in FIG. 4. To this end, the calibration data generating device 58 receives from the evaluation device 52 the level of a constituent which is based on a relationship saved (fixed and permanently) in the memory 54. It furthermore receives the associated level from the monitoring and evaluation device 46 of the second sensor 18. With the aid of the two constituent levels, the calibration data generating device 58 can determine any desired mathematical relation (in this embodiment used ultimately as a calibration value for the first sensor 16) between the constituent level measured by the first sensor 16 and the constituent level measured by the second sensor 18. In the simplest case, this mathematical relation represents a correction factor or a linear dependency, although any desired more complicated relations, which may be compiled in the form of a formula, table, or the like, are also possible.

This mathematical relation determined in step 106 is used in step 108 (shown in more detail in FIG. 5) by the evaluation device 52 in order to correct the levels of constituent(s) determined with the aid of the spectra and the relationship, which in this embodiment is not changed, saved in the memory 54. Step 108 is followed by step 102 again.

In the procedure according to FIG. 2 and the description above, after all this the constituent level(s) available on the outgoing line 48 of the second sensor 18 are used directly to convert the constituent level(s) determined by the first sensor 16 and the evaluation device 52 with the aid of the relationships saved in the memory 54 and the spectra. The output value 56 may therefore be recalibrated at regular time intervals, which are contingent on the measurement time of the second sensor 18. During the time in between, the first sensor 16 successively provides the output values 56 as described above.

FIG. 3 shows a second procedure, which differs from the procedure according to FIG. 2 by steps 206 and 208, which replaced steps 106 and 108. Furthermore, the calibration data generating device 58 receives from the evaluation device 52 not the constituent level determined by the latter, but the spectrum associated with the material 14 being examined, or data based thereon. In step 206 (cf. FIG. 6), the calibration data generating device 58 ascertains the relationships between the spectrum and the constituents, which are used as calibration data and are entered into the memory 54 and are used in the subsequent step 208 (see FIG. 7) in order to convert the spectra into the constituent levels and output these as output values 56. For the compilation of the relationships, reference is again made to German Patent Appl. No. DE 10 2020 000 904 A1, the disclosure of which is incorporated by reference into the present documents. There is the possibility of generating the said relationships in the calibration data generating device 58 by a self-learning algorithm, for example a neural network. The calibration data generating device 58 may also accumulate many samples over a prolonged period of time and only then compile a new relationship. This procedure may be repeated at regular intervals or as required, for example in the event of a change in properties of the material being examined, such as pressure, temperature, etc., in which case the older spectra and constituents, or ones measured with other properties, or relationships determined therefrom may be incorporated into the new relationships with a reduced weighting or entirely discarded.

In this way, the second sensor 18 supplements or replaces the previous determination of the said relationships in the laboratory, which avoids the disadvantages explained in the introduction.

It should also be mentioned that the location of the evaluation device 52 and/or the calibration data generating device 58 is arbitrary. They could for example be integrated into an electronic unit fitted in the housing 20 of the first sensor 16, or they may be located at a distance from the machine 10, for example on a remote server or in the cloud and be connected to the sensors wirelessly or by lines. The calibration data determined in step 106 or 206 (mathematical relation or relationships between the spectra and constituents) may also be made available to other sensors 68, which have the same design as the sensor 16, by direct or indirect (for example taking place via a server or the cloud) data transmission. To this end, the said calibration data may be sent by means of a sending and receiving device 60 of the machine 10 wirelessly, for example by using an object protocol (for example WLAN or GSM or 5G), or by means of a data medium, to a server 64 at a remote site 62, from which it may be communicated wirelessly or by means of a portable data medium to a further machine 66 having a third sensor 68, which has the same design as the first sensor 68. This third sensor 68 may use the calibration data to achieve more accurate output values.

The calibration data determined in steps 106 or 206, as well as the relationships saved in the memory 54, are furthermore dependent on the nature of the material 14 being sensed. Particularly when they are intended to be used by other sensors 68, the calibration data therefore contain information relating to the nature of the respectively associated material 14. They may also contain further information relating to the material 14, for example concerning its pressure, temperature or pH, as disclosed in German Patent Appl. No. DE 10 2020 000 904 A1. With the aid of this information and associated data of sensors for detecting corresponding parameters of the material 14 being examined, the third sensor 68 may deliver more accurate output values than without taking these into account.

Those skilled in the art will recognize that it is common within the art to implement apparatuses and/or devices and/or processes and/or systems in the fashion(s) set forth herein, and thereafter use engineering and/or business practices to integrate such implemented apparatuses and/or devices and/or processes and/or systems into more comprehensive apparatuses and/or devices and/or processes and/or systems. That is, at least a portion of the apparatuses and/or devices and/or processes and/or systems described herein can be integrated into comprehensive apparatuses and/or devices and/or processes and/or systems via a reasonable amount of experimentation.

Although the present disclosure has been described in terms of specific embodiments and applications, persons skilled in the art can, considering this teaching, generate additional embodiments without exceeding the scope or departing from the spirit of the present disclosure described herein. Accordingly, it is to be understood that the drawings and description in this disclosure are proffered to facilitate comprehension of the present disclosure and should not be construed to limit the scope thereof.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

It should also be noted that the different examples described herein can be combined in different ways. That is, parts of one or more examples can be combined with parts of one or more other examples. All of this is contemplated herein.

DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein.

Figure 1:
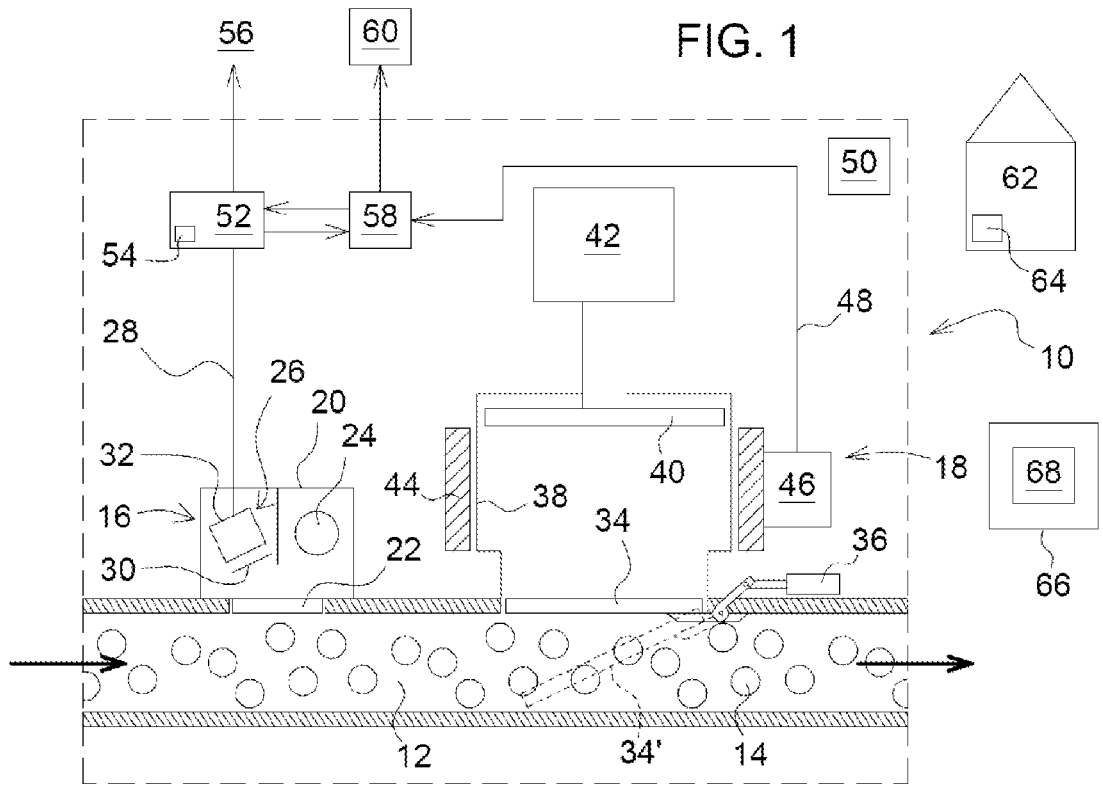
FIG. 1 shows a schematic view of an agricultural machine having a sensor arrangement.
Figure 2:
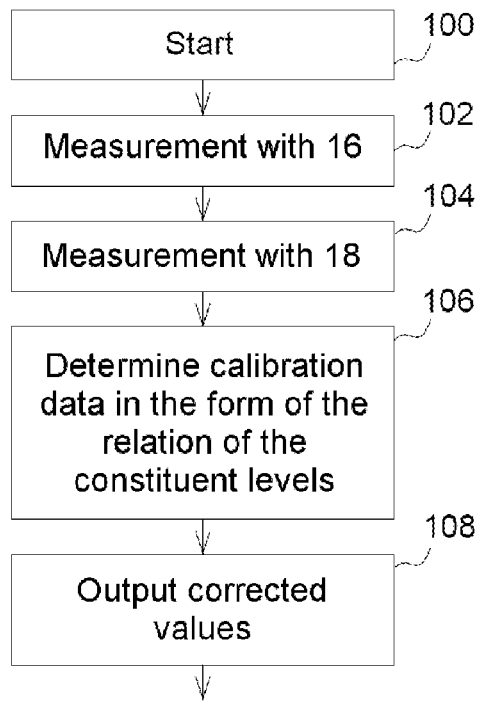
FIG. 2 shows a flowchart relating to a first procedure of the sensor arrangement.
Figure 3:
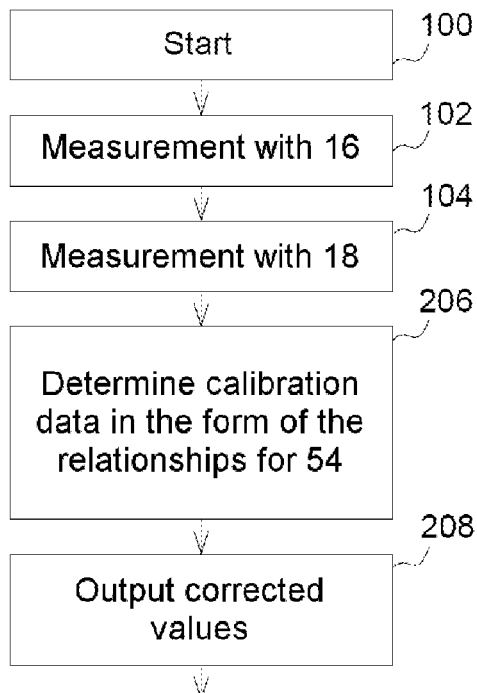
Figure 4:
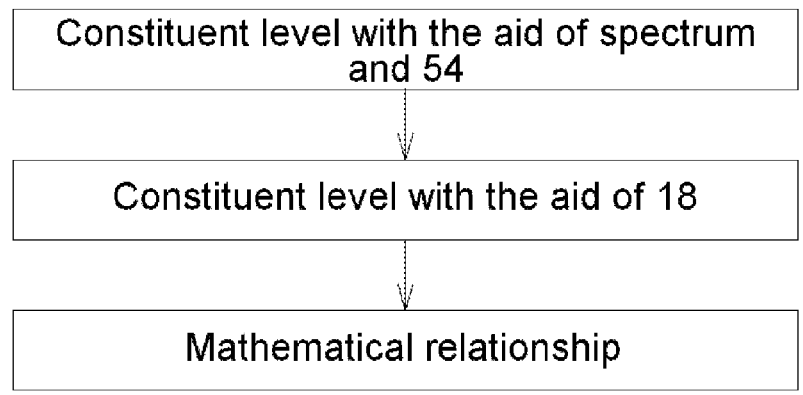
Figure 5:
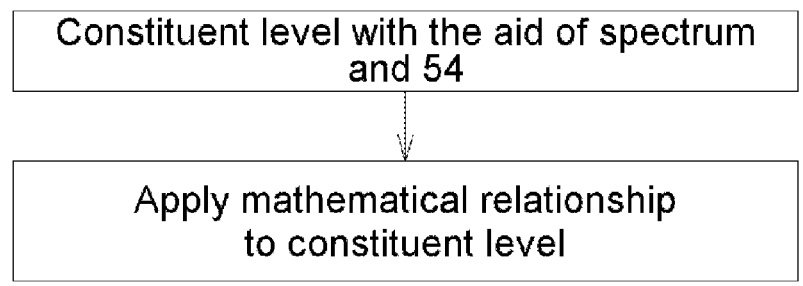
Figure 6:
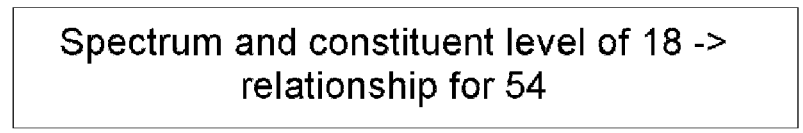
Figure 7:
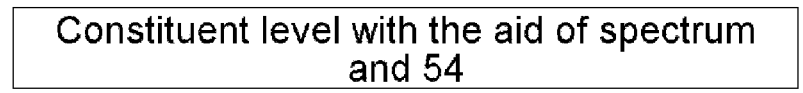

FIG. 3 shows a flowchart relating to a second procedure of the sensor arrangement; and FIGS. 4-7 show diagrams to illustrate steps 106, 108, 206 and 208 of FIGS. 2 and 3.

DETAILED DESCRIPTION

Generally, a spectrum may be converted into the constituent level by using a linear model of the form Constituent=$\Sigma_i$ Spectrum*Coefficient+Offset. Intensities of the components i of the spectrum are therefore respectively multiplied by the coefficient associated with the value i and summed up. The coefficients and the offset are typically established with the aid of a learning data set from spectra and associated constituent levels, which are determined independently of the spectroscopic measurement by conventional analysis methods in the laboratory, by suitable linear regression methods (calibration algorithm).

A spectroscopic measurement is therefore conducted on a number of samples, each with known constituent levels, to determine the associated relationship (here: coefficient and offset) for a constituent to be examined for each of the i wavelengths examined. These relationships are finally stored, and are used during a following measurement of an unknown sample in order to ascertain the proportion of the constituent with the aid of the recorded spectrum by using, for example, the aforementioned equation (cf. J. B. Reeves III et al., Near-Infrared Spectroscopic Determination of Carbon, Total Nitrogen, and Ammonium-N in Dairy Manures, J Dairy Sci 83 (2000), pages 1829-1836).

The compilation of the relationships can be carried out by taking samples during a working or harvesting process from the crop flow and analysis in the laboratory (French Patent Appl. No. FR 2 801 380 A1, European Patent Appl. No. EP 1 378 742 A2), in which case the recording of the spectra used for compiling the relationships may also take place during the working or harvesting process directly from the sample respectively taken (WIPO Patent Appl. No. WO 2005/003728 A2; German Patent Appl. No. DE 102 36 515 C1; M. Ewers et al., NIR-Sensor for determination of product quality of grain while combining, CIGR World Congress "Agricultural Engineering for a Better World" from 3-7 Sep. 2006 in Bonn, VDI-Berichte No 1958, pages 163-164 and related CD).

European Patent Appl. No. EP 0 908 087 A1 describes a combine harvester having a feeder house, arranged below the cleaner, which delivers the cleaned grain to the elevator. The feeder house is assigned a first, capacitively operating moisture sensor interacting with the grain flow and a second moisture sensor following downstream. The second moisture sensor receives a sample, taken from the crop flow, which is comminuted and heated to detect the proportion of water evaporating. The moisture value of the second moisture sensor, determined as accurately as possible, may be compared by a sensor state monitoring apparatus with the moisture value ascertained by the first moisture sensor, and a correction factor for the first moisture sensor may be determined in the event of differences.

In some examples, besides spectroscopic analyses of agricultural materials, it is also proposed to use an NMR sensor, which is based on nuclear magnetic resonance. The underlying principle of this measurement method is that nuclei of magnetically active atoms (nonzero spin) are in a first, static magnetic field and exposed to a second, oscillating magnetic field. Because of the interaction between the second magnetic field and the dipole moments of the nuclei aligned in the first, static magnetic field, resonance energy is released and generates a measurable electromagnetic field which contains detailed information relating to the structure, dynamics, the reaction state and the chemical environment of the molecular material to be sensed (cf. P. Mazzei et al., HRMAS NMR spectroscopy applications in agriculture, Chem. Biol. Technol. Agric. (2017) 4:11 and the references cited therein). European Patent Appl.

The invention claimed is:

1. A sensor apparatus for detecting constituents of a material, the sensor apparatus comprising:
   a first sensor, which interacts with the material, configured to measure an optical spectrum of the material;
   a second sensor including a housing having an interior in which a sample of the material is collected, the second sensor configured to analyze the sample of the material and to output a signal relating to a level of one or more constituents in the sample of the material;
   a calibration data generating device configured to generate calibration data based on the signal of the second sensor; and
   an evaluation device coupled to the first sensor, the evaluation device configured to output an output value relating to the level of the one or more constituents in the material based on the measured optical spectrum and the calibration data.

2. The sensor apparatus of claim 1, wherein the first sensor is a near-infrared spectrometer configured to obtain spectroscopic measurements by at least one of reflection and transmission.

3. The sensor apparatus of claim 1, wherein the second sensor is a nuclear magnetic resonance sensor.

4. The sensor apparatus of claim 3, wherein the evaluation device is configured to output a subsequent output value based on a relationship between the measured optical spectrum and the output value.

5. The sensor apparatus of claim 4, wherein the evaluation device is configured to correct the output value based on the measured optical spectrum and the relationship between the measured optical spectrum and the output value.

6. The sensor apparatus of claim 4, wherein;
   the calibration data generating device is configured to determine calibration data based on a relationship between the measured optical spectrum and the level of the one or more constituents in the material; and
   the evaluation device is configured to use the calibration data based on the relationship between the measured optical spectrum and the level of the one or more constituents in the material during subsequent measurements.

7. The sensor apparatus of claim 1, wherein the first sensor is adjacent to a channel through which the material flows and the second sensor is configured to analyze the sample of the material from the channel.

8. The sensor apparatus of claim 1, wherein the calibration data generating device has a signal-transmitting connection to a third sensor to send calibration data.

9. The sensor apparatus of claim 1, wherein the level of the one or more constituents in the material is stored with geo-referencing.

10. An agricultural working machine comprising:
    a first sensor, which interacts with a material being processed by the agricultural working machine, configured to measure an optical spectrum of the material;
    a second sensor including a housing having an interior in which a sample of the material is collected, the second sensor configured to analyze the sample of the material and to output a signal relating to a level of one or more constituents in the sample of the material;

a calibration data generating device configured to generate calibration data based on the signal of the second sensor; and an evaluation device coupled to the first sensor, the evaluation device configured to output an output value relating to the level of the one or more constituents in the material based on the measured optical spectrum and the calibration data.

11. The agricultural working machine of claim 10, wherein actuation of a component of the agricultural working machine is based on the level of the one or more constituents in the material.

12. The agricultural working machine of claim 11, wherein the level of the one or more constituents in the material is based on the calibration data, the calibration data including a relationship between the measured optical spectrum and a previous output value.

* * * * *